(12) United States Patent
Lüchinger (10) Patent No.: US 6,603,081 B2
(45) Date of Patent: Aug. 5, 2003

(54) BALANCE WITH A WEIGHING COMPARTMENT

(75) Inventor: Paul Lüchinger, Uster (CH)

(73) Assignee: Mettler-Toledo GmbH, Greifensee (CH)

( * ) Notice: Subject to any disclaimer, the term of this patent is extended or adjusted under 35 U.S.C. 154(b) by 131 days.

(21) Appl. No.: 09/957,934

(22) Filed: Sep. 21, 2001

(65) Prior Publication Data

US 2002/0040815 A1 Apr. 11, 2002

(30) Foreign Application Priority Data

Oct. 4, 2000 (CH) ................................. 1957/00

(51) Int. Cl.⁷ .................... G01G 21/00; G01G 21/28; G01G 21/08
(52) U.S. Cl. .................... 177/126; 177/180; 177/238; 177/260; 177/262
(58) Field of Search .................... 177/126, 127, 177/128, 180, 181, 182, 238, 239, 240, 241, 242, 243, 244, 260, 262, 263

(56) References Cited

U.S. PATENT DOCUMENTS

| | | | |
|---|---|---|---|
| 4,156,361 A | 5/1979 | Melcher et al. | 73/1.13 |
| 4,425,975 A | 1/1984 | Lüchinger | 177/50 |
| 4,566,548 A | 1/1986 | Södler et al. | 177/229 |
| 4,932,487 A | 6/1990 | Melcher et al. | 177/50 |
| 5,148,881 A | 9/1992 | Leisinger | 177/50 |
| 6,420,666 B1 * | 7/2002 | Baumeler et al. | 177/145 |

FOREIGN PATENT DOCUMENTS

DE          9203744          8/1993

* cited by examiner

Primary Examiner—Randy Gibson
(74) Attorney, Agent, or Firm—Friedrich Kueffner (57) ABSTRACT

A balance (1) has a weighing compartment (3) and a balance housing (4), which contains a weighing cell (15) and forms a rear wall (13) and a floor (8) for the weighing compartment (3). A weighing-load carrier (2) is arranged on a cantilever arm (30) of the weighing cell (15). The rear wall (13) of the weighing compartment is equipped with a stationary holder system (21) that allows a variety of weighing-compartment accessories to be releasably installed at different levels above the floor (8) of the weighing compartment.

22 Claims, 11 Drawing Sheets

BALANCE WITH A WEIGHING COMPARTMENT

BACKGROUND OF THE INVENTION

The present invention relates to a balance with a housing that contains a weighing cell and forms the rear wall and the floor of a weighing compartment. The weighing-load carrier of the balance is held by a cantilever arm of the weighing cell.

Balances of this type serve mainly as analytical balances and are used widely in laboratories.

The German utility model DE-U-299 12 867 discloses a balance with an auxiliary display in addition to the main display for the weighing result. The auxiliary display is mounted on the stationary rear wall of the weighing compartment, inside the draft enclosure, and indicates time and/or temperature and other ambient conditions.

Another balance of relevance to the present invention is described in the German utility model DE-U-92 93 744. It is designed so that electronic measuring elements can be installed on the weighing pan by means of a special auxiliary pan that holds the weighing material to be weighed as well as the measuring element. The auxiliary pan has a connector element with a plug for the measuring element. A height-adjustable stand for the processor unit of the measuring element is set up outside of the balance. The electrical cable between the connector element on the auxiliary pan and the stand is arranged to transfer only horizontal forces.

All of the aforementioned known balances suffer from the drawback that their range of applications is very limited and that they lack the flexibility to be adapted for different tasks.

OBJECT OF THE INVENTION

It is therefore the object of the present invention to propose a balance that is of a compact design but is nevertheless adaptable to a multitude of applications as well as optimized with regard to user ergonomics.

SUMMARY OF THE INVENTION

According to the invention, the foregoing objective is realized in a balance with a balance housing that contains a weighing cell and forms the rear wall and the floor of a weighing compartment. The balance has a weighing-load carrier held by a cantilever arm of the weighing cell. Built into the rear wall of the weighing compartment is a holder system that allows a variety of weighing-compartment accessories to be releasably installed at different levels above the floor of the weighing compartment.

The balance according to the invention is distinguished by its compact design. The inventive arrangement offers a multitude of application possibilities, as will be described below through examples. Thus, the balance has the flexibility to be adapted for different kinds of experiments, which can be performed inside the weighing compartment.

In a preferred embodiment of the invention, the holder system contains two vertical grooves running parallel to the rear wall. In a further developed version of the same embodiment, a portion of the rear wall projects into the weighing compartment like a column, where the grooves are arranged in the laterally facing flanks. The holder system has a plurality of identically shaped connector formations for a form-fitting attachment of weighing-compartment accessories that have complementary counterparts to the connector formations.

The holder system is advantageous for a height-adjustable installation of shelves, holders for laboratory devices and/or an indicator unit or an ionizer unit to avoid the build-up of electrostatic charges. Shelves attached to the holder system are useful for substance containers, tools, etc. The holder system is configured so that the laboratory devices and/or an indicator unit can be easily installed as well as removed. Laboratory devices that could be installed include, e.g., dispensing devices for powdery and liquid substances.

Depending on the application, the holder system can also include conductor tracks for an electrical power- or signal connection.

In a further embodiment of the invention in a balance for weighing in a microgram range, the holder system may be used to hold an interior draft-shield enclosure with side walls that can be raised for placing a weighing object on the weighing-load carrier.

The holder system in a preferred embodiment of the invention has a motorized drive mechanism to raise and lower the accessory devices that are attached to the holder system.

In a preferred embodiment of the invention, the cantilever arm of the weighing cell has a coupling arrangement that protrudes into the weighing compartment through passage openings in the rear wall. The weighing-load carrier is releasably attached to the coupling arrangement. In particular, the coupling arrangement is located to the sides of the holder system and/or in alignment with the grooves.

According to a further preferred embodiment, the weighing-load carrier is configured as a plane horizontal grate. This concept offers many application possibilities within the scope of laboratory weighing. For example, containers or accessories of the most diverse kinds can be either set on the grate or clipped to the grate. Spilled weighing material does not stay on the weighing-load carrier, but drops between the bars of the grate, so that the spilled material cannot be inadvertently included in a weighing. In a particularly favorable design, the bars of the grate have a roof-like triangular profile with a ridge on top, which enhances the tendency of spilled material to drop off the weighing-load carrier, so that the potential for weighing errors is reduced even further.

The weighing-load carrier can also be configured as a holder for laboratory vessels. To make the dispensing of substances into the vessels more convenient, the holder can be rotatable to different tilt angles.

A preferred embodiment of the invention has a load-relief mechanism to lift the load off the weighing-load carrier. The load-relief mechanism is arranged at the rear wall and has a lift platform shaped like a grid of bars or spaced-apart lamellae. When the lift platform is raised, the bars or lamellae of the lift platform come up through the gaps between the bars of the weighing-load carrier and lift the weighing object off the carrier grate. With the load-relief mechanism, it is not necessary to remove and subsequently return the weighing load when re-zeroing the balance. Thus, a potential source of weighing errors is avoided. It is also possible to perform long-term weight studies and recalibrate the balance between the individual weighings.

Other advantageous embodiments of the balance according to the invention provide the possibility of integrating code-identification systems or set-ups for experiments into the balance, e.g., for turbidity measurements, to make certain work processes more efficient.

Advantageous traits of a balance according to the invention are its compact design and its modular configuration that make it remarkably versatile for a variety of laboratory applications. The inventive balance is distinguished by its flexibility and by how quickly it can be reconfigured for different applications. In addition, cleaning the separate components is very easy.

BRIEF DESCRIPTION OF THE DRAWINGS

Further details of the invention may be learned from the following description of embodiments that are schematically illustrated in the drawings, wherein.

DETAILED DESCRIPTION OF PREFERRED EMBODIMENTS

Figure 1:
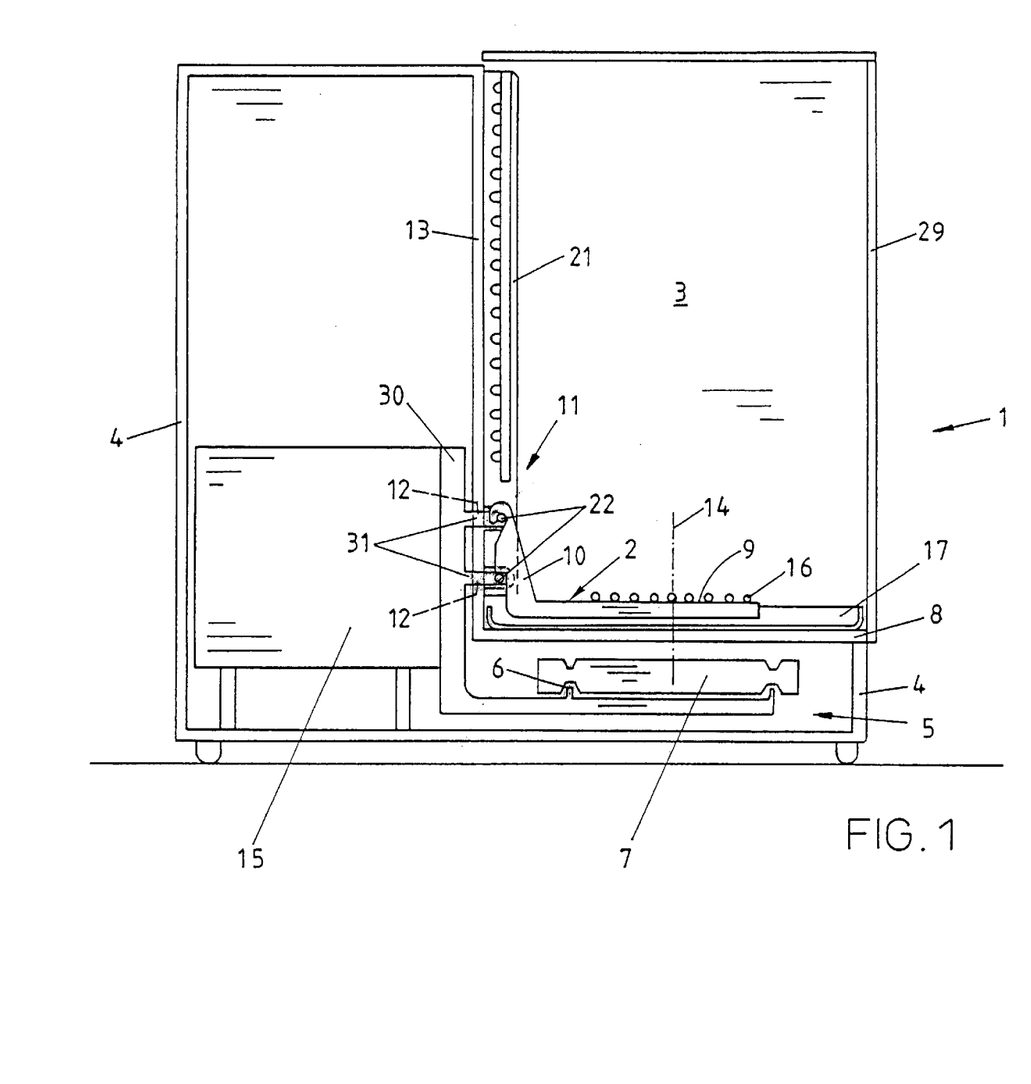
FIG. 1 represents a side view of the balance.

FIG. 1 shows a side view of the balance 1 with a balance housing 4 and a draft shield 29 enclosing the weighing compartment 3. The left-hand portion of the balance housing 4 contains the weighing cell 15, which is not illustrated in detail. An L-shaped cantilever 30 with a calibration device 5 is connected to the load-receiving portion of the weighing cell 15 to introduce the weighing load into the weighing cell. The horizontal portion of the L-shaped cantilever 30 has a weight-receiving element 6 for the calibration weights 7. The calibration device 5 is arranged in a portion of the balance housing 4 that is closed off by the floor 8 against the weighing compartment 3. The vertical portion of the L-shaped cantilever 30 has projections 31 extending towards the weighing compartment and standing out through the passage openings 12 of the rear wall 13 of the weighing compartment 3. The projections 31 with coupler bolts 22 form a coupling arrangement 11. The weighing-load carrier 2 has hook-on portions 10 that are seated on the coupler bolts 22, so that the weighing load carrier 2 can easily be detached from the coupler bolts 22. The weighing-load carrier 2 serves as a platform for a variety of clip-on devices used in different applications, for example bowls, laboratory vessels, other containers for weighing samples, or for the weighing samples themselves. In the example of FIG. 1, the weighing-load carrier is configured as a level grate 16. A grate also reduces the potential for weighing errors due to air drafts, because the grate offers a smaller effective surface to air currents than a weighing platform with a solid surface.

Other configurations are conceivable for the weighing-load carrier 2. It could, e.g., be designed as a holder for one or more laboratory vessels, with the holder being attached to the coupling arrangement 11 through an adapter. This would even allow the design flexibility to make the holder rotatable into different tilt angles.

Of course, a weighing-load carrier 2 could also be attached to the cantilever arm 30 by a connection that passes through an opening in the floor 8 of the weighing compartment. Also, the present invention is equally applicable regardless of whether or not a balance is equipped with a calibration device 5.

FIG. 1 also shows a spill-collector plate 17, which serves to catch materials dropped from the weighing-load carrier 2. The spill-collector plate 17 may be designed to be removable for easy cleaning.

Also in FIG. 1, a holder system 21 is shown, which is located at the rear wall above the place where the hook-on portions 10 of the weighing-load carrier 2 are hooked onto the bolts 22 on the projections 31. The holder system 21 offers a variety of user conveniences and applications related to weighing. In particular, the holder system 21 serves to attach weighing-compartment accessories at different vertical heights from the floor 8. This makes it possible to conduct experiments inside the weighing compartment 3. Several advantageous kinds of accessory items that can be attached to the holder arrangement 21 are shown in FIGS. 2 to 5 to serve as examples of the diversity of uses of the holder system 21.

Figure 2:
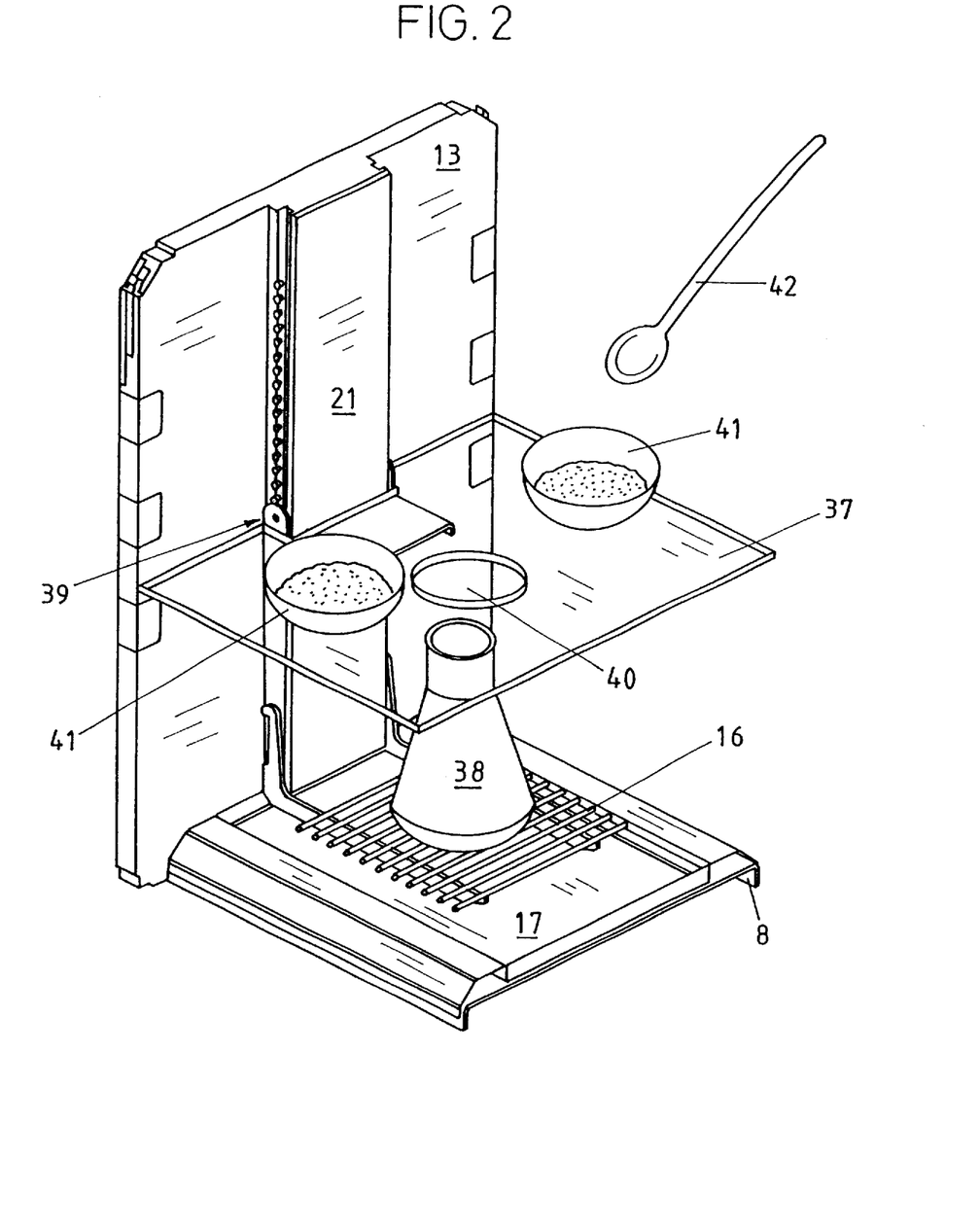
FIG. 2 gives a perspective view of a setup where the holder system is used to attach a shelf.

FIG. 2 gives a perspective view of the weighing compartment 3 with a shelf 37 installed on the holder system 21 at a freely selectable height from the floor 8. As shown in the example of FIG. 2, the shelf 37 can be used to hold a container 41 for substances that are to be weighed and which can, e.g., be fed with a spoon 42 through the opening 40 into the laboratory container 38 sitting on the grate platform 16 of the weighing-load carrier 2. Of course, it is also possible to use shelves without an opening. A possible concept for the attachment device 39 that connects the shelf 37 to the holder system 21 will be described below in the context of FIGS. 6A to 6C.

Figure 3:
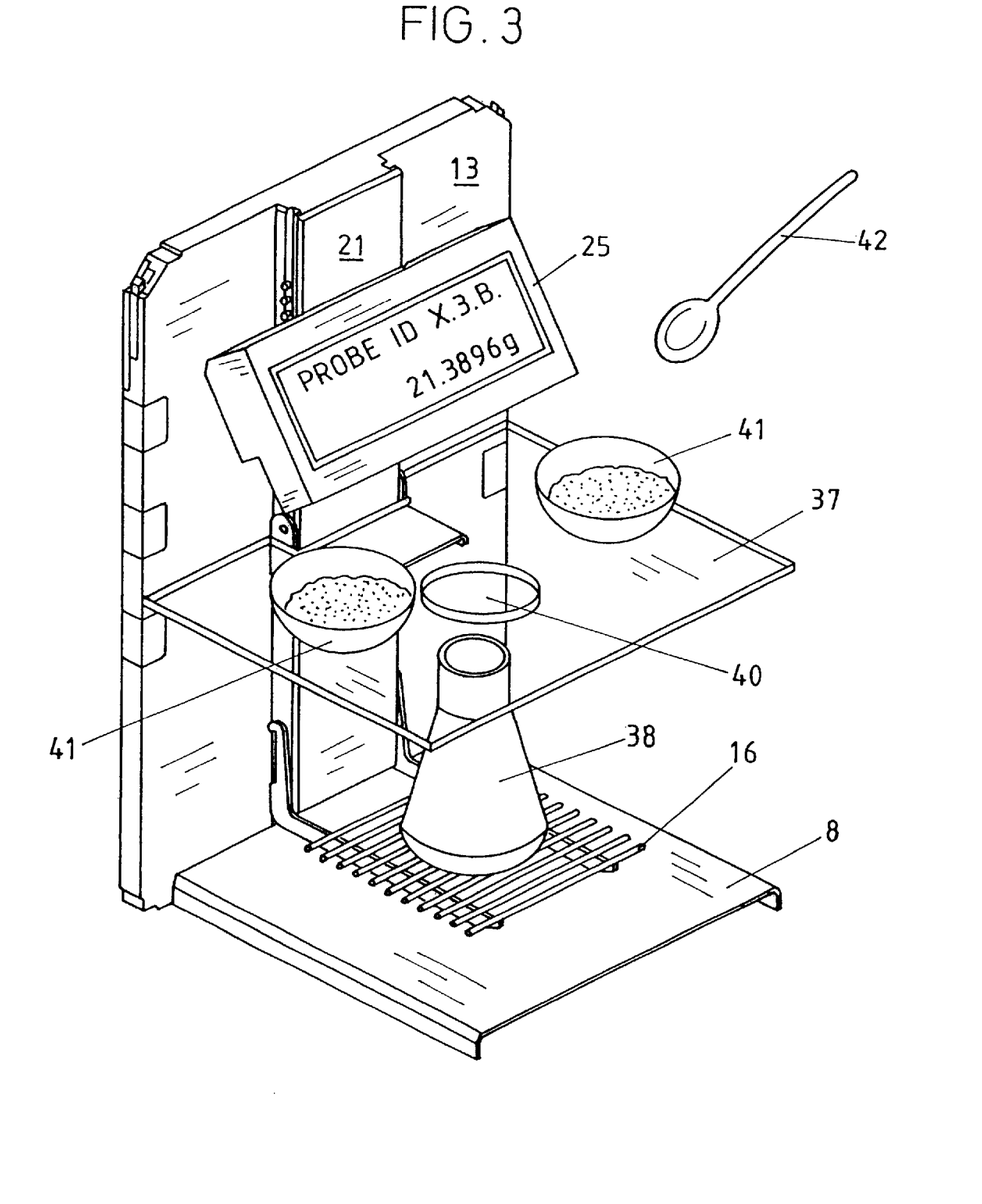
FIG. 3 gives a perspective view of the same setup as FIG. 2 with the addition of a variably tiltable balance display.

FIG. 3 shows the same arrangement of a shelf 37 as FIG. 2, with the addition of a tilt-adjustable display panel 25 that can be hooked onto the holder system 21 at a selectable height from the floor 8. The display panel 25 is particularly advantageous from the point of view of user ergonomics, because the operator can follow the increase in the weighing result without a change of viewing angle when adding material to a weighing container on the balance.

Figure 4:
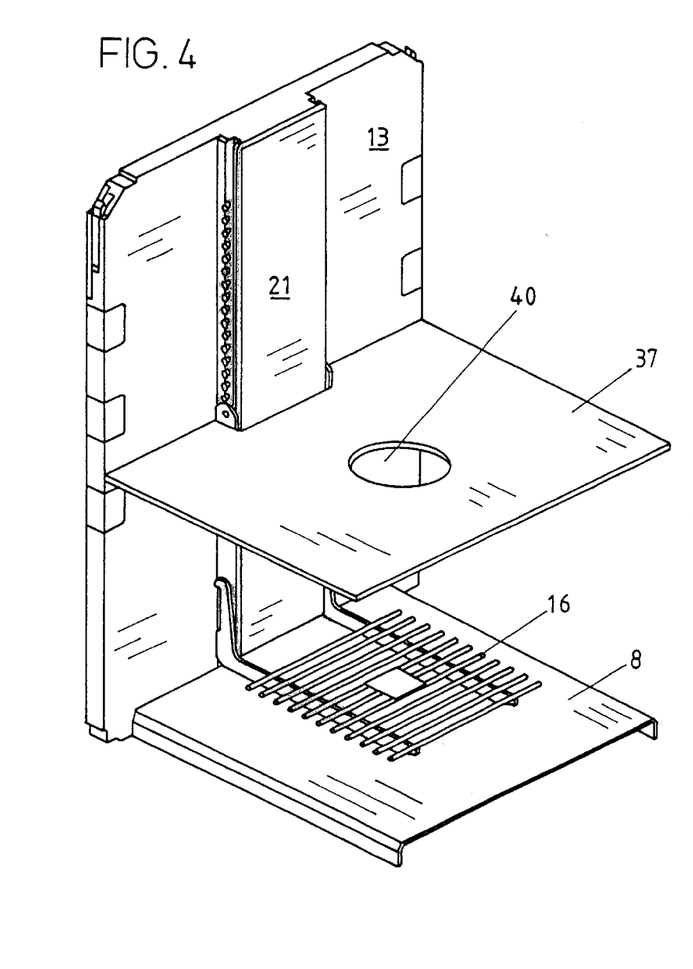
FIGS. 4, 4A and 4B illustrate further uses for the shelf in a three-dimensional view.
Figure 4A:
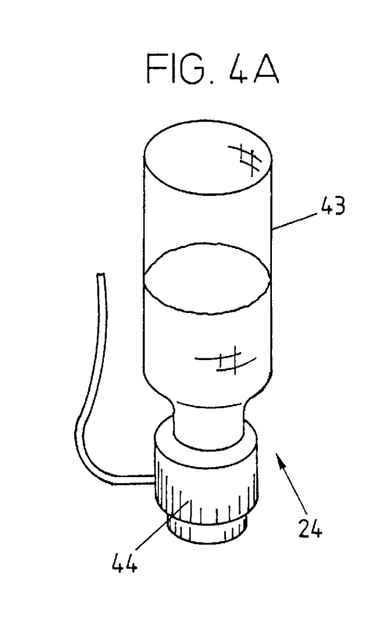
Figure 4B:
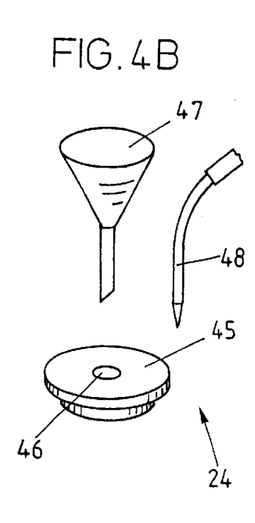

As shown in FIG. 4, a shelf 37 with an opening 40 can be used to hold a laboratory device 24. FIG. 4A, for example, illustrates a container 43 filled with a powder, which is at the bottom connected to a controllable dispensing system 44. The dispensing system 44 with the container 43 can be set or into the opening 40, or it can even be secured with a twist or snap connection. FIG. 4B shows an adapter 45, which may have, e.g., one or more small openings 46 for funnels 47, hoses 48, etc., and is designed to be inserted in the opening 40.

Figure 5:
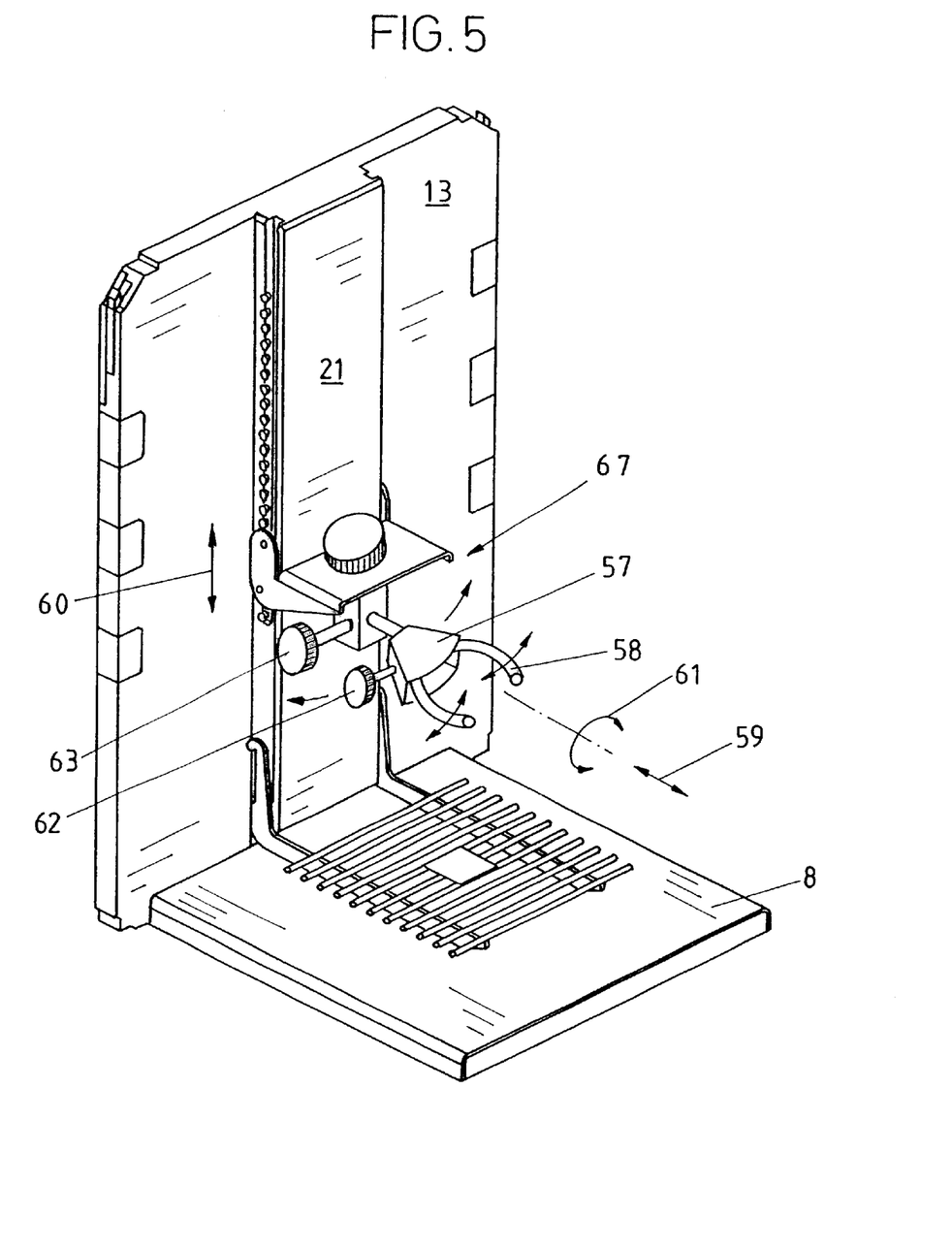
FIG. 5 shows a further use of the holder system in a three-dimensional view.

Another possible application for the holder system 21 is shown in FIG. 5. The holder 67, which is height-adjustable on the holder system 21 in the directions indicated by the double-headed arrow 60, has a clamp device 57 for holding different accessory devices (not shown), such as laboratory containers, laboratory devices, dispensing systems for powders or liquids, or other items related to the weighing process. A double-armed spring clamp 58 is adjustable in its lengthwise and angular positions in the directions of the double-headed arrows 59 and 61 by means of the knurled screws 62 and 63.

The holder system 21 also offers a multitude of other diverse possibilities to install devices inside the weighing compartment 3. For example, it is conceivable to attach an ionizer (not shown in the drawings) to the holder system 21 as a means of preventing the build-up of electrostatic charges on the weighing objects.

Figures 6A, 6B, 6C:
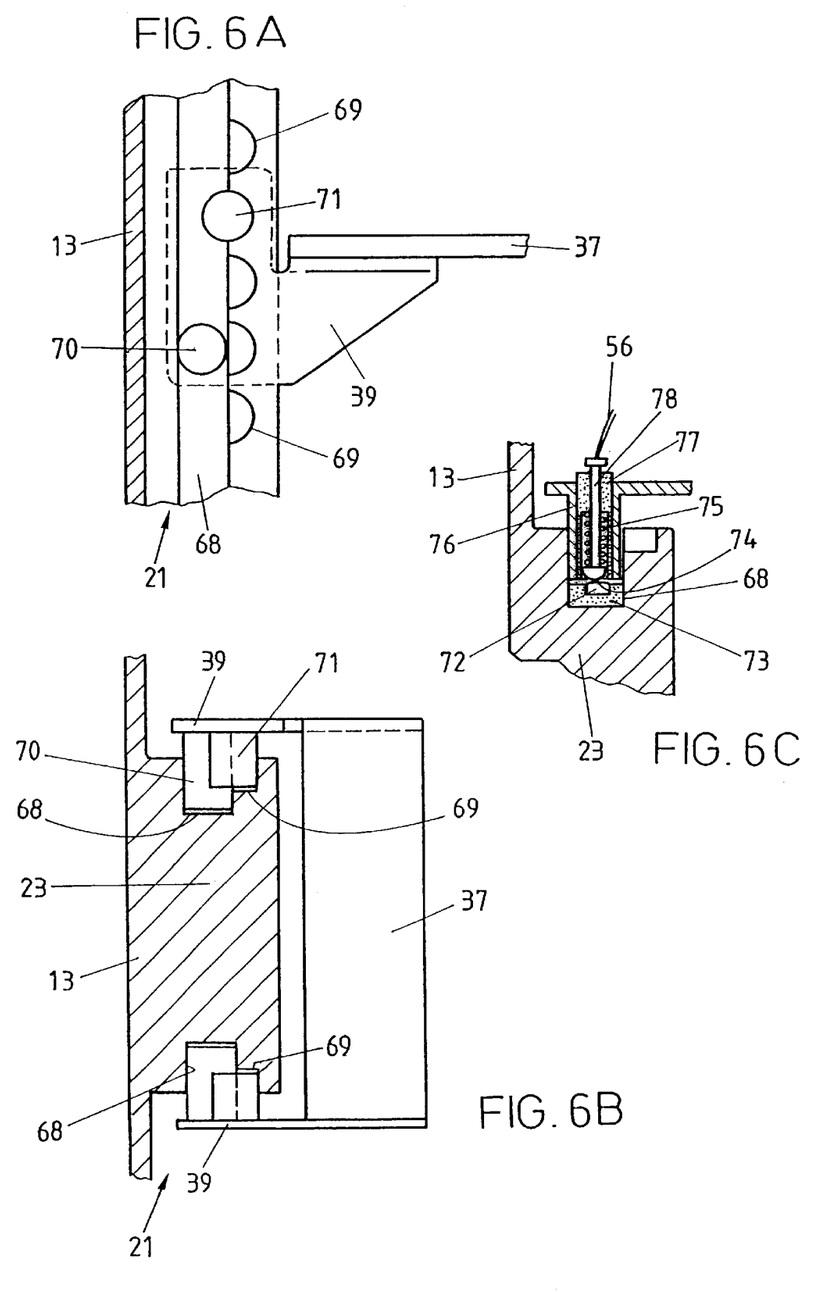
FIGS. 6A and 6B represent a side view and a top view, respectively, of a concept for setting the holder system at different heights.
FIG. 6C represents a top view of a detail of the concept for an electrical connection.

FIGS. 6A and 6B show, respectively, a side view and a cross-sectional view of one of many connector mechanisms for installing shelves 37 and/or equipment holders 67 on the holder system 21. The holder system 21 has the shape of a vertical rail or column 23 on the rear wall 13. The column 23 has vertical grooves 68 on its lateral flanks. The coupling arrangement 11, where the weighing-load carrier 2 is attached, is located in the lower portion of the column 23, in alignment with the grooves 68 (also see FIGS. 2 to 5). The sides of the grooves 68 that are closer to the front of the holder system 21 have semi-circular recesses 69 spaced at regular intervals, providing form-fitting seats for pegs 71 of the attachment device 39 for a shelf 37 or equipment holder 67. The pegs 71 are offset towards the rear in relation to the pegs 70 and stay in the grooves 68. By slightly lifting the shelf 37 or equipment holder 67 at the end facing the operator of the balance, the pegs 71 come out of the semi-circular recesses 69 as the shelf is tilted about an axis formed by the pegs 70. In the tilted position of the shelf or equipment holder, the pegs 70 and 71 can be moved up or down in the grooves 68 to a new position, where the pegs 71 are set into another pair of semi-circular recesses 69 by turning the shelf 37 or equipment holder 67 back to the horizontal position.

It is also possible to make the attachment device 39 continuously adjustable, e.g., without steps. If the semi-circular recesses are left out and the distance between the pegs 70 and 71 is small enough, the shelf 37 or equipment holder 67 will be kept in place by the friction between the pegs and the grooves.

A motorized height adjustment for the attachment device 39 of the shelf 37 or the equipment holder 67 with the clamp device 57 may also be considered as a possibility.

FIG. 6C represents a sectional view of a design concept for a power- and/or data connection in the connecting mechanism of the holder system 21. A conducting rail 72 on an insulator 73 is imbedded in one or both of the grooves 68 (which are preferably arranged in the flanks of the holder system 21). The attachment device 39 of the shelf 37 or holder 67 has a hollow peg 76 with an insulation 77. The hollow peg 76 contains a spring-loaded contact pin 78, so that the pinhead 74 is pushed by the spring 75 into sliding contact with the conducting rail 72. This allows electric current for a power- or signal transmission to be sent through the lines 56, the pin 78, and the rail 72.

Figure 7:
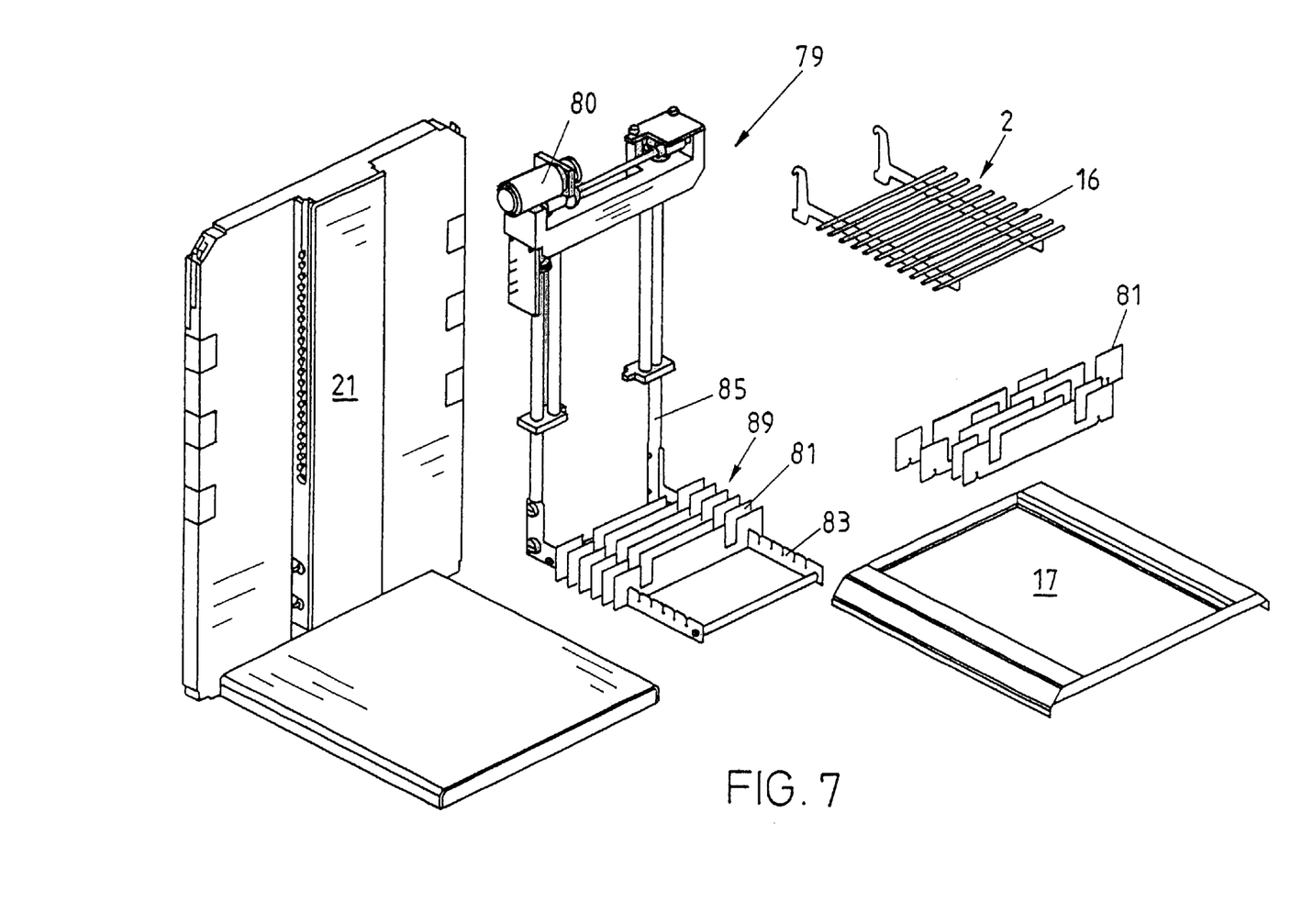
FIG. 7 represents a perspective view of a load-relief mechanism.

FIG. 7 gives a perspective view of a load-relief mechanism 79 that can be set into the holder system 21. The mechanism has an L-shaped frame 85 and a motor 80 for raising and lowering a lift platform 89 with two arms 83 and a grid of spaced apart lamellar elements 81. When the lift platform is raised, the lamellar elements 81 come up through the gaps between the bars of the grate 16 of the weighing-load carrier 2.

Figure 8:
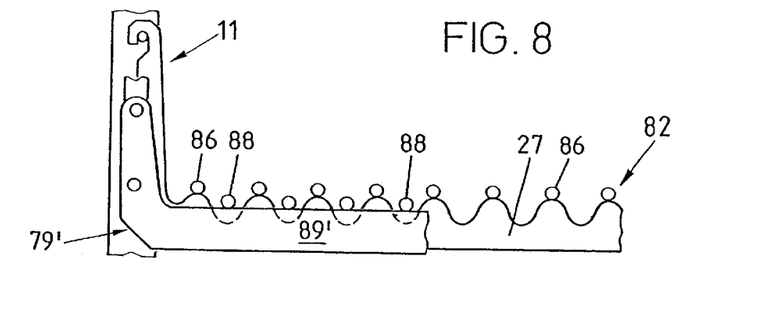
FIG. 8 represents a side view of a grid-shaped lift platform and of the load carrier grate of the balance.

FIG. 8 shows a differently designed detail portion of a load relief system 79' in the area of the weighing-load carrier 82 and the lift platform 89'. The weighing-load carrier 82, which is connected to the coupler arrangement 11, has a design in which the two lateral support beams 27 of the grate have wave-shaped contours with the bars 86 of the grate attached to the tops of the waves. The bars 88 of the load-relief system 79' are arranged so that they lie between and normally below the bars 86, extending through the valleys of the wave contours. When the lift platform 89' is raised, the bars 88 of the lift platform 89' will come up through the gaps between the bars 86 of the weighing-load carrier 82 into a position above the plane of the bars 86.

Figure 9A:
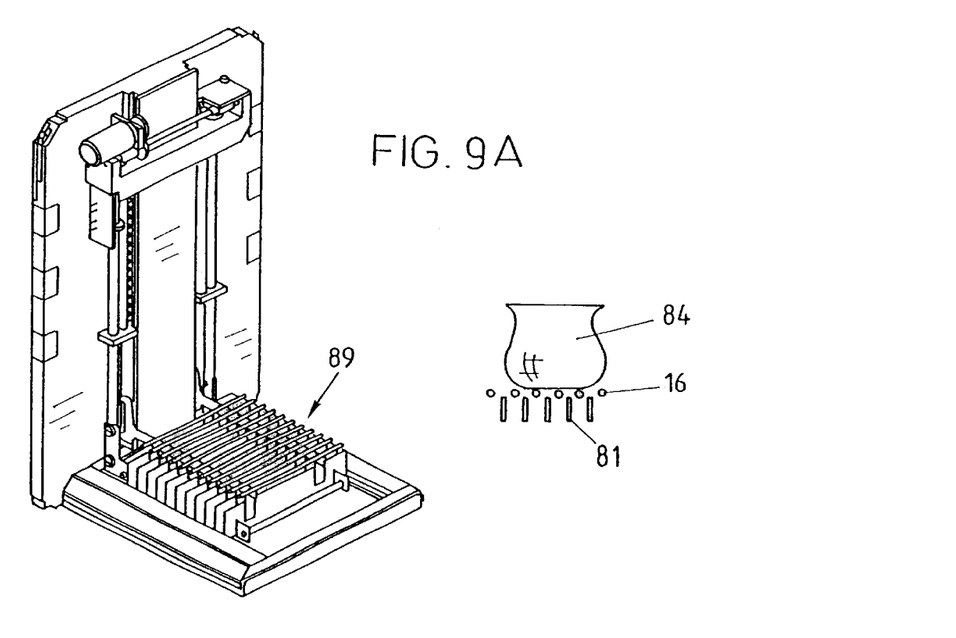
FIGS. 9A and 9B illustrate in a perspective view how the load-relief mechanism works.
Figure 9B:
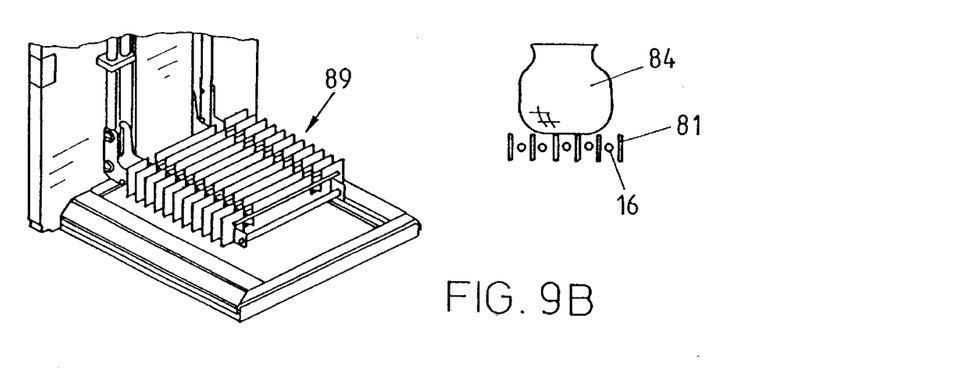

An example of how the load-relief system 79 works is illustrated in FIGS. 9A and 9B with the lamellar arrangement of the lift platform. FIG. 9A shows the load-relief system in the position for weighing, where the weighing container 84 rests on the grate 16 of the weighing-load carrier 2. The lamellae 81 of the lift platform grid are in the down position. In contrast, FIG. 9B shows the up position of the lift platform, where the weighing container 84 is lifted off the grate 16 of the weighing-load carrier 2, resting instead on the raised lamellae 81 of the lift platform 89. The lamellar arrangement of the lift platform as well as the grate 16 of the weighing-load carrier 2 are easy to clean.

A useful application of the load-relief system is in long-term weight studies where it is necessary to re-zero the balance at prescribed time intervals and to take the weighing load off the weighing-load carrier for the re-zeroing. It is also conceivable to recalibrate the balance during a long-term application. The load-relief system is further useful, when multiple weighings of the same weighing sample have to be made for statistical purposes, e.g., to determine a standard deviation. This normally requires that the weighing object be taken off the weighing pan between weighings in order to ascertain that the zero point of the balance has not drifted off. With the load-relief system, the weighing object does not have to be manually taken off and set back, so that the process of statistical weighings becomes more efficient and reliable.

The frame 85 of the load-relief system 79, 79' is configured in such a way, that even with the load-relief system 79, 79' installed, it is still possible to use the holder system 21 to fasten accessory devices, e.g., a shelf 37 or A holder 67 at any desired height from the weighing compartment floor 8.

It is further conceivable to design the load-relief system 79, 79' so that it is flexible to be used in alternative applications. For example, by removing the lamellae 81 or the lift platform 89, 89' in a case where the balance does not need to be re-zeroed or recalibrated with a weighing load in place, the load-relief system 79, 79' could become usable for the motorized height adjustment of accessories that are fastened to the holder system 21, e.g., a shelf 37 or a holder 67. Instead of being attached directly to the holder system 21, the shelf 37 or holder 67 would be attached to the load-relief system 79, 79' which, in turn, is connected to the holder system 21. Alternatively, the holder system 21 itself can be designed to perform the function of raising and lowering an attached object.

Figure 10:
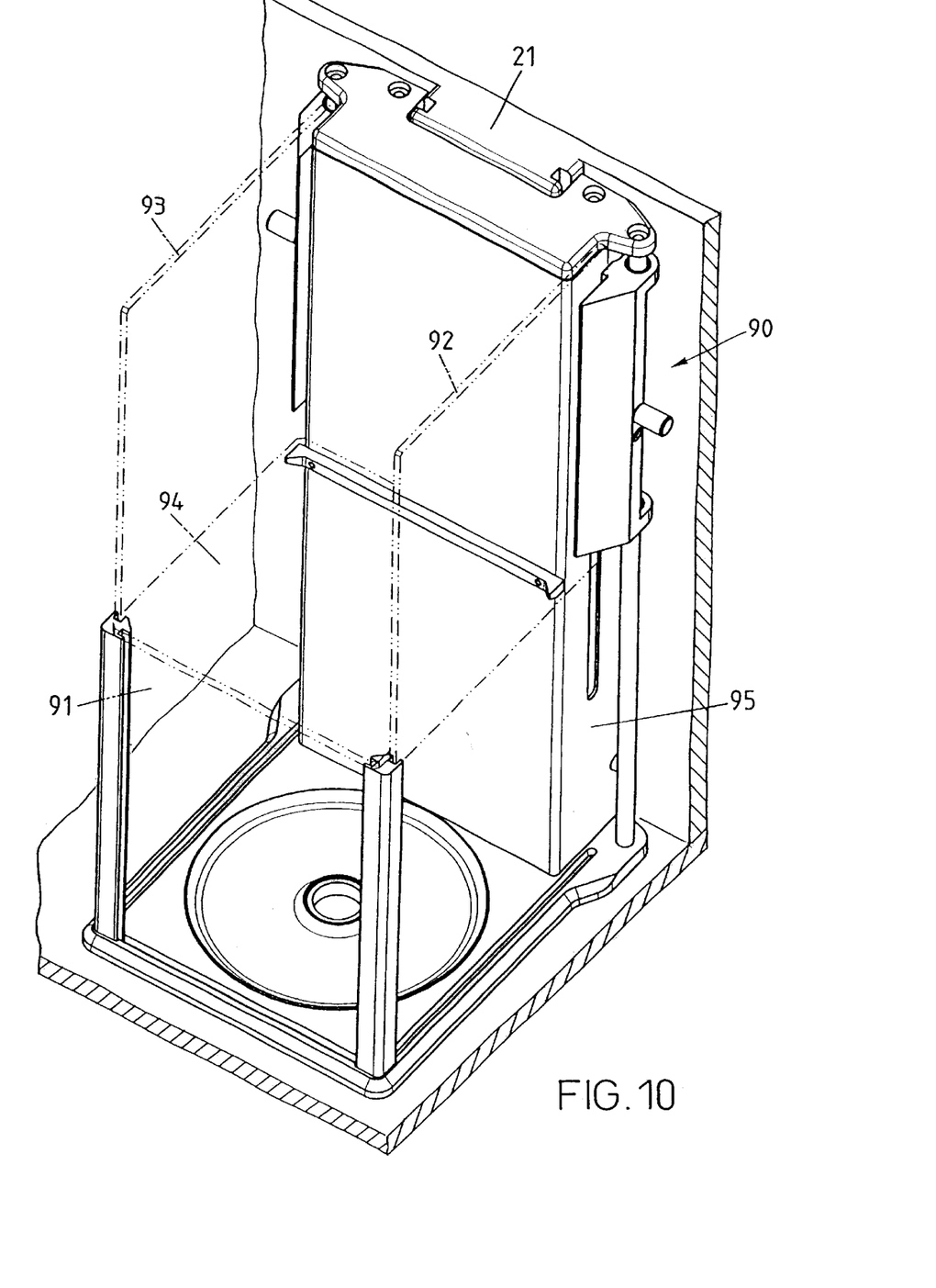
FIG. 10 illustrates an interior draft shield enclosure with motorized up- and down-movement of the side walls in a perspective view.

The holder system 21 serves to install further useful devices in the weighing compartment 3, as illustrated in FIG. 10. For weighings in the most sensitive range with a precision of 0.1 to 1 micrograms, an interior draft shield 90 is installed inside the draft shield 29 that surrounds the weighing compartment 3. The interior draft shield 90 consists of a front wall 91, two side walls 92, 93, a top cover panel 94, and a rear compartment 95 for a drive mechanism. The rear compartment 95 forms the rear wall of the interior draft shield 90 and is attached to the holder system 21. The upper portion of the rear compartment 95 contains a cord-pulley drive that is powered by a motor and connected to the side walls 92, 93. The cord-pulley drive (which represents only an example and could also be replaced by a spur-belt drive) serves to move the side walls 92, 93 up and down, either individually or together, to open and close the interior draft shield 90. The interior draft shield 90 is easily removed from the weighing compartment 3, because it is merely hooked on to the holder system 21, similar to the shelf 37. The interior draft shield 90 is particularly suitable for balances with a weighing-load carrier that is connected through an opening in the weighing compartment floor to a cantilever arm of the weighing cell.

Figure 11:
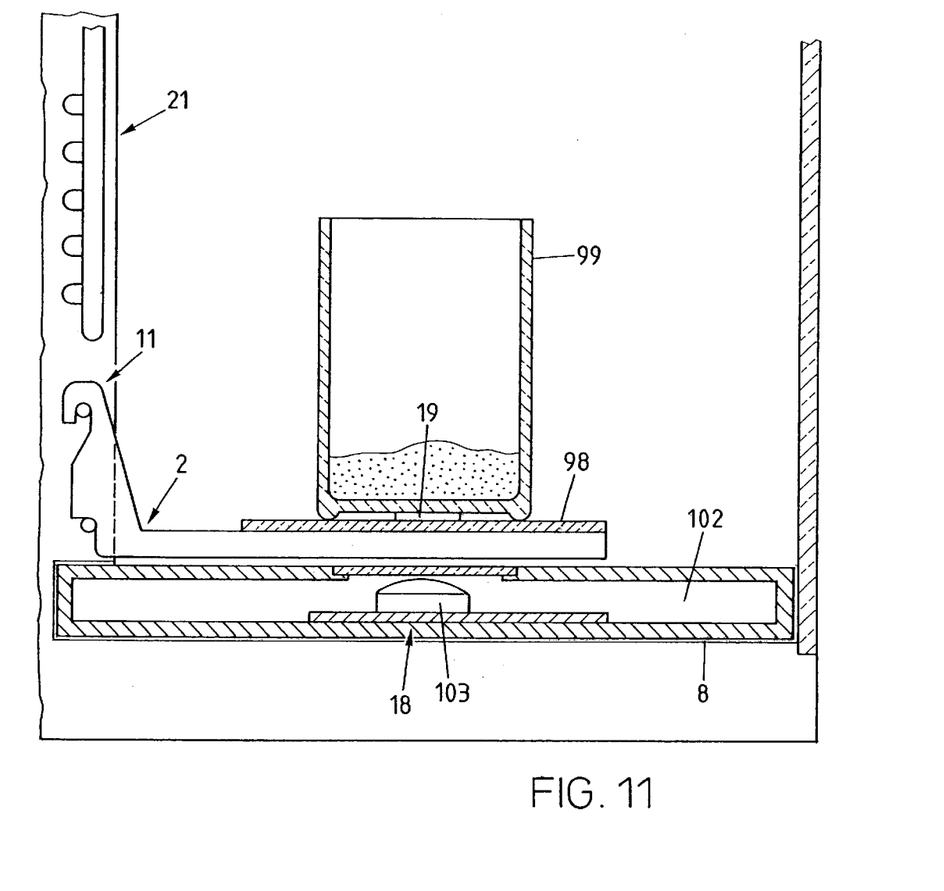
FIG. 11 represents a side view of an arrangement for a code reader system to identify weighing containers.

The arrangement where the weighing-load carrier 2 is connected to the weighing cell 15 through a coupler arrangement 11 at openings 12 in the rear wall 13 of the weighing compartment 3 opens up flexible design possibilities. As the floor 8 remains free for other uses, it is possible to install an optical or inductive code-reader device 18 in the floor 8 below the weighing-load carrier 2, e.g., to read an identification code 19 on the bottom of a weighing container 99. As can be seen in FIG. 11, the optical or inductive code-reader device 18 is installed in an insert module 102 placed on the floor 8 of the weighing compartment. Preferably, the emitter and receiver parts of the code-reader device 18 are contained in the same sensor housing 103. In the area of the identification code 19, the carrier platform 98 of the weighing-load carrier 2 is either transparent, e.g., made of glass (for an optical reader system) or non-inductive, e.g., made of a ceramic or polymer material (for an inductive reader system).

The code-reader device 18, whether it uses an optical or inductive sensor, can also be arranged to the side of the weighing-load carrier 2, with the identification code 19 being in this case located on the side wall of the container 99. In particular, the code reader device 18 can be designed to be attached to the holder system 21 at a selected height from the floor 8 of the weighing compartment.

Figure 12:
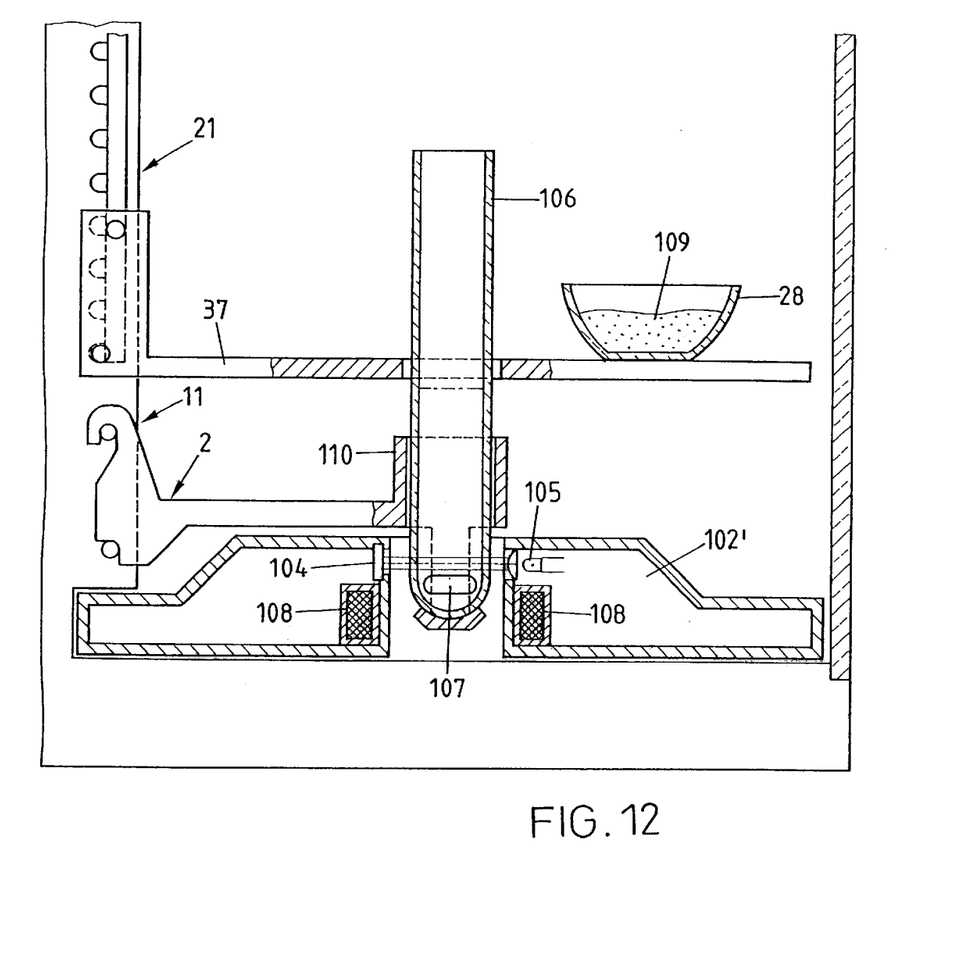
FIG. 12 represents a side view of a setup for turbidity measurements.

It is also possible to perform turbidity measurements in the weighing compartment 3 (see FIG. 12) by means of an insert module 102' placed on the floor 8 of the weighing compartment 3. The insert module 102' has a raised portion on top, containing a laser 104 as emitter and a photo-diode 105 as receiver. The turbidity is determined by measuring the amount of light transmitted through a transparent measuring container 106 with planar wall portions in the area of the light path. A stirrer can be placed on the bottom of the measuring container 106, such as the magnetic stirrer 107 shown in the drawing, which is driven by the alternating magnetic field of the magnets 108. The measuring container is held in place by the holder 110 that is connected to the weighing-load carrier 2. It is particularly advantageous that weight and turbidity can be measured in combination. In the experimental setup shown in FIG. 11, a shelf 37 with an opening for the measuring container 106 is attached to the holder system 21. From a glass container 28 on the shelf 37, a substance 109 is dispensed into the measuring container 106, which causes a change in the weight and turbidity of the liquid in the container 106. After the turbidity measurement has been completed, the weight of the liquid in the measuring container 106 can be determined after the magnetic stirrer has been shut off.

For experimental setups of all kinds that are installed in the weighing compartment, cables and hoses can be passed from the outside into the weighing compartment through openings that can be closed with clip-on covers. Details are described in the parallel Swiss patent application CH-1958/00.

As mentioned previously, the inventive concept of making the weighing compartment adaptable for setting up experimentation devices of the kind described above is not limited to balances where the weight force is transmitted to the weighing cell through openings in the rear wall of the weighing compartment, but applies equally to balances where the weight force is transmitted through an opening in the floor of the weighing compartment, as well as other types of balances not specifically described.

| LIST OF REFERENCE SYMBOLS | |
|---|---|
| 1 | balance |
| 2 | weighing-load carrier |
| 3 | weighing compartment |
| 4 | balance housing |
| 5 | calibration device |
| 6 | receiving element |
| 7 | calibration weight |
| 8 | floor |
| 9 | load-carrying surface |
| 10 | hook-on portions |
| 11 | coupling arrangement |
| 12 | passage openings |
| 13 | rear wall |
| 14 | vertical axis |
| 15 | weighing cell |
| 16 | grate |
| 17 | spill-collector plate |
| 18 | code-reader device |
| 19 | code |
| 21 | holder system |
| 22 | coupler bolts |
| 23 | column-like projection |
| 24 | laboratory devices |
| 25 | balance display panel |
| 27 | lateral support beams |
| 28 | glass container |
| 29 | draft shield |
| 30 | cantilever arm |
| 31 | projections |
| 37 | shelf |
| 38 | laboratory container |
| 39 | attachment device |
| 40 | opening |
| 41 | container |
| 42 | spoon |
| 43 | container |
| 44 | dispensing system |
| 45 | adapter |
| 46 | openings |
| 47 | funnel |
| 48 | hoses |
| 56 | electrical power or signal lines |
| 57 | clamp device |
| 58 | double-armed spring clamp |
| 59 | double-headed arrow |
| 60 | double-headed arrow |
| 61 | double-headed arrow |
| 62 | knurled screw |
| 63 | knurled screw |
| 67 | eguipment holder |
| 68 | groove |
| 69 | semi-circular recess |
| 70 | peg |
| 71 | peg |
| 72 | conductor rail |
| 73 | insulation |
| 74 | contact pin head |
| 75 | spring |
| 76 | hollow peg |
| 77 | insulation |

-continued

LIST OF REFERENCE SYMBOLS

| | |
|---|---|
| 78 | contact pin |
| 79 | load-relief system |
| 79' | load-relief system |
| 80 | motor for load-relief system |
| 81 | lamellar elements |
| 82 | weighing-load carrier |
| 83 | arms |
| 84 | container |
| 85 | frame |
| 86 | bars of weighing-load carrier grate |
| 88 | bars of lift platform |
| 89 | lift platform |
| 89' | lift platform |
| 90 | interior draft shield |
| 91 | front wall |
| 92 | side wall |
| 93 | side wall |
| 94 | top cover panel |
| 95 | rear compartment |
| 98 | platform of weighing-load carrier |
| 99 | weighing container |
| 102 | insert module |
| 102' | insert module |
| 103 | sensor housing |
| 104 | laser |
| 105 | photo diode |
| 106 | measuring container |
| 107 | magnetic stirrer |
| 108 | magnets |
| 109 | substance |
| 110 | holder |

What is claimed is:

1. A balance (1) comprising a weighing compartment (3); a balance housing (4) containing a weighing cell (15) and forming a rear wall (13) and a floor (8) for the weighing compartment (3); a weighing-load carrier (2) arranged on a cantilever arm (30) of the weighing cell (15); and a stationary holder system (21) arranged on the rear wall (13), said holder system being adapted for attaching weighing-compartment accessories at different vertical distances from the floor (8).

2. The balance of claim 1, wherein the holder system (21) comprises two parallel vertical grooves (68) running parallel to the rear wall (8).

3. The balance of claim 2, wherein the rear wall (13) comprises a projecting column portion (23) with laterally facing flanks and wherein the grooves 68 extend in said flanks.

4. The balance of claim 1, wherein the holder system (21) has a plurality of identically shaped connector formations (69) for a form-fitting attachment of weighing-compartment accessories that have complementary counterparts (71) to said connector formations.

5. The balance of claim 1, wherein the holder system (21) is adapted for attaching at least one of a shelf (37) and an equipment holder (67).

6. The balance of claim 5, wherein the shelf (37) and the equipment holder (67) are adapted so that other holder devices can be attached to them.

7. The balance of claim 1, wherein the holder system (21) comprises contact rails (72) to transmit at least one of an electric current and data signals.

8. The balance of claim 1, wherein said weighing compartment accessories consist of at least one of laboratory devices (24), a dispensing system (44) for liquids, a dispensing system (44) for solids, an ionizer, and a tilt-adjustable display panel (25), and wherein further said different vertical distances are adjustable.

9. The balance of claim 1, wherein the holder system (21) is further adapted for installing an interior draft shield (90) with side walls (92, 93) that open by sliding upward.

10. The balance of claim 1, wherein the holder device (21) is adapted for attaching a code-reader device (18) at an adjustable height from the floor (8) for reading a code (19) attached to a side wall of a weighing container (99).

11. The balance of claim 1, wherein the holder system (21) comprises a motorized drive for adjusting said different vertical distances.

12. The balance of claim 3, wherein the rear wall (13) has passage openings (12), the cantilever arm (30) has a coupling arrangement (11) extending through the passage openings (12), and the weighing-load carrier (2) is releasably attached to the coupling arrangement (11).

13. The balance of claim 12, wherein the passage openings (12) are arranged substantially in alignment with the grooves (68).

14. The balance of claim 12, wherein the weighing-load carrier (2) comprises a level grate (16).

15. The balance of claim 12, wherein the weighing-load carrier (2) comprises a holder for at least one laboratory container.

16. The balance of claim 12, further comprising a spill-collector plate (17) with an uninterrupted surface between the weighing-load carrier (2) and the floor (8).

17. The balance of claim 12, wherein the balance (1) is adapted so that an insert module (102) can be installed on the floor (8) of the weighing compartment (3), said insert module (102) comprising a code-reader device (18) for reading a code (19) attached to an underside of a weighing container (99).

18. The balance of claim 12, wherein the balance (1) is adapted so that an insert module (102') can be installed on the floor (8) of the weighing compartment (3), said insert module (102') comprising an apparatus (104, 105) for measuring an amount of turbidity of a weighing sample.

19. The balance of claim 12, wherein the balance (1) is adapted so that a stirring device (107, 108) for stirring a substance in a measuring container (106) can be installed on the floor (8) of the weighing compartment (3).

20. The balance of claim 12, wherein the cantilever arm (30) has a weight-receiving element (6) for calibration weights (7) of a calibration device (5), and wherein further the floor (8) extends without openings between the weight-receiving element (6) and the weighing-load carrier (2).

21. The balance of claim 1, wherein the balance (1) is adapted so that a load-relief system (79, 79') can be attached to the balance housing (4) inside the weighing compartment (3).

22. The balance of claim 21, further comprising a motor (80) to drive the load-relief system (79, 79').

* * * * *